(No Model.)
C. BARNES.
SHAFT COUPLING.
No. 275,877. Patented Apr. 17, 1883.
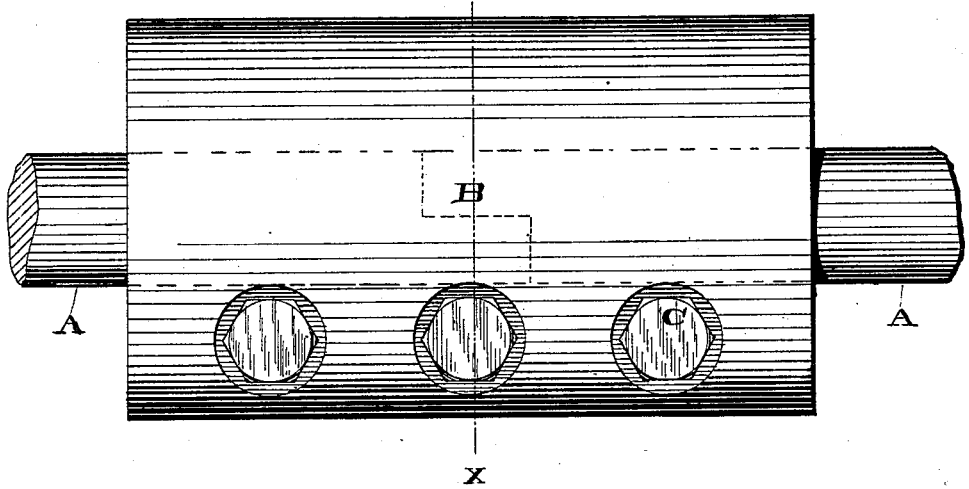
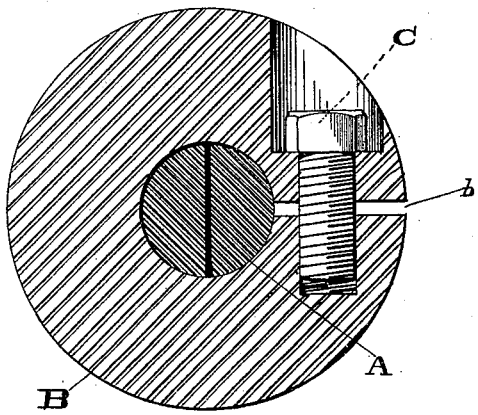
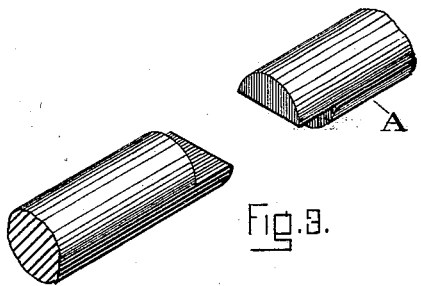
Attest.
Horatio V Croll
Ed. Worthington
Inventor
Charles Barnes
By Geo J Murray
Atty

UNITED STATES PATENT OFFICE.

CHARLES BARNES, OF DAYTON, KENTUCKY.

SHAFT-COUPLING.

SPECIFICATION forming part of Letters Patent No. 275,877, dated April 17, 1883.

Application filed April 5, 1882. (No model.)

*To all whom it may concern:*

Be it known that I, CHARLES BARNES, of Dayton, in the county of Campbell, State of Kentucky, have invented certain new and useful Improvements in Shaft-Couplings, of which the following is a specification.

This invention relates to means for coupling the ends of shafts.

It consists in overlapping or jointing the shaft ends together, and holding them rigidly against slipping or turning by a longitudinally-slitted clamping-sleeve bored to snugly fit the shaft and turned smooth on its exterior.

In the accompanying drawings, Figure 1 is an elevation of my improved coupling. Fig. 2 is a transverse section of the same, taken through line $x$ of Fig. 1. Fig. 3 is a perspective view of two shaft ends prepared to receive my clamping-sleeve.

Similar reference-letters refer to like parts wherever they occur in the different views.

The shafts A are each cut away on the ends, so that the cut-away portions will overlap when placed within the clamping-sleeve B, as shown in Fig. 2 and in dotted line, Fig. 1. The clamping-sleeve I make preferably of cast-iron cored out, and having the longitudinal slot $b$, extending from the periphery through to the central bore. Depressions or counter-bores $b'$ are also cast in the sleeve to receive the heads of the clamping-screws C. After the sleeve is cast a strip of metal is placed in the slot $b$ and clamped by the screws, while the central opening is bored out true to snugly fit the shafts A. The sleeve is then clamped upon a shaft centered in a lathe and turned off upon the outside and ends, so as to present a smooth cylindrical exterior surface, which is entirely unbroken by any projecting parts and not liable to catch slack belting or any loosely-hanging fixtures or attachments. To couple the shafts the sleeve is slipped over one shaft, the ends of the two shaft-sections lapped together, as shown in dotted line, Fig. 1, the sleeve set to its place over the joint, and the screws C, tightened by a key or wrench, clasping the shafts evenly all around and holding them securely.

Instead of halving the ends of the shafts together, as shown, they may be matched together, a tenon upon one entering a mortise cut in the other section.

I am aware that it is old to rabbet the meeting ends of shaft-sections together, and then secure them by means of a sectional clamp or sleeve. I am also aware that longitudinally-slitted clamping-sleeves having a smooth exterior surface have heretofore been used for coupling shaft-sections, and I make no claim to these old features, broadly.

I claim—

In a shaft-coupling, the combination, substantially as before set forth, of the shaft-sections overlapping or matched together, the longitudinally-slitted clamping-sleeve bored to snugly fit the shaft-sections and having its exterior surface turned smooth, and the clamping-screws C, seated in countersunk recesses in the sleeve.

CHARLES BARNES.

Witnesses:
ALFRED B. BENEDICT,
GEO. J. MURRAY.